(No Model.)

J. T. DOUGINE.
FIFTH WHEEL FOR WAGONS.

No. 307,752. Patented Nov. 11, 1884.

Witnesses.
Taylor E. Brown
Stuart H. Brown

Inventor.
James T. Dougine
By Munday, Evarts & Adcock
his Attorneys.

N. PETERS. Photo-Lithographer, Washington, D. C.

UNITED STATES PATENT OFFICE.

JAMES T. DOUGINE, OF CHICAGO, ILLINOIS.

FIFTH-WHEEL FOR WAGONS.

SPECIFICATION forming part of Letters Patent No. 307,752, dated November 11, 1884.

Application filed August 11, 1884. (No model.)

*To all whom it may concern:*

Be it known that I, JAMES T. DOUGINE, a citizen of the United States, residing in Chicago, in the county of Cook and State of Illinois, have invented a new and useful Improvement in Fifth-Wheels for Wagons, of which the following is a specification.

This invention relates to fifth-wheels for wagons, and more particularly to certain improvements upon the fifth-wheel heretofore patented to me under date of April 29, 1884, in patent numbered 297,685.

In the present improvement the axle and bolster are connected together by a ball-and-socket joint, the socket-plate being rigidly secured to the bolsters and the ball-plate to the axle, the stop or upper surface of the ball-plate, which limits the rocking motion of the axle and bolster, being low at each side toward either end of the axle, so that the axle may rock or incline to the bolster when the wheels run over high or low places, and said stop or upper surface being high at its front and rear points, so as to prevent the axle and bolster from rocking backward or forward. In my previous invention the stop which limited the rocking motion of the bolster and axle was made to turn with the socket-plate secured to the bolster instead of with the axle, so that when the axle was turned nearly at right angles to the bolster the axle could incline but little, and there was consequently danger of great strain being thrown upon the braces and other parts if one of the wheels should run into a rut or over an obstruction while the axle was turned in this position to the bolster. By the present improvement either end of the axle can incline up and down as freely when the axle is turned at right angles to the bolster as when it stands parallel thereto, while the axle is effectually prevented from rocking backward or forward—that is to say, at right angles to the direction of its length.

Another feature of the invention consists in casting the plate which is secured to the axle with a socket for the tongue.

Figure 1:
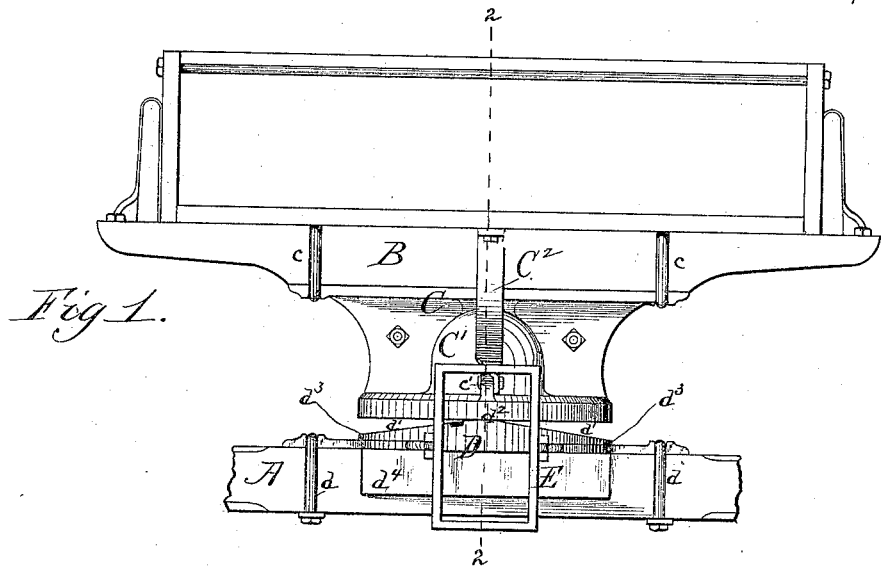
Figure 2:
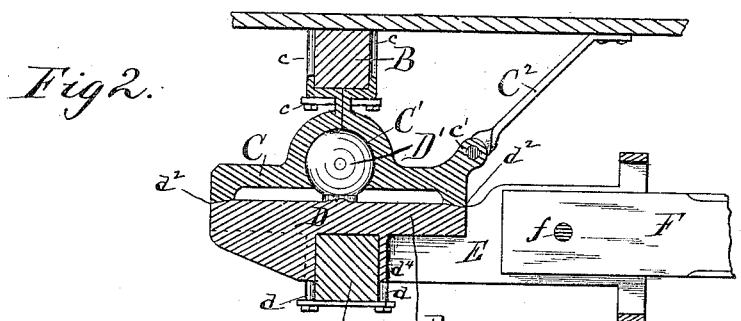
Figure 3:
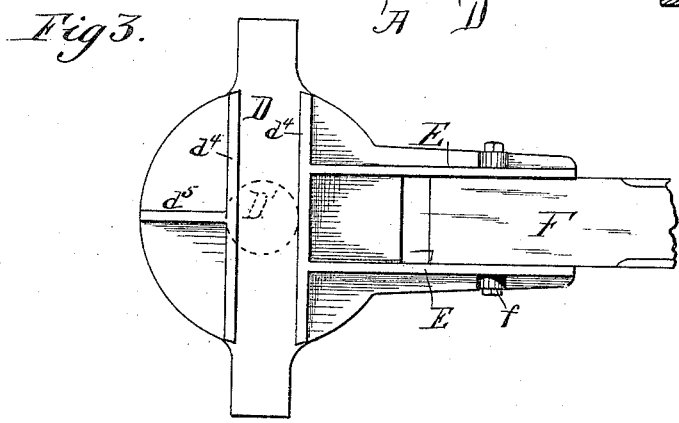

In the accompanying drawings, which form a part of this specification, and in which similar letters of reference indicate like parts, Figure 1 is a front view of a device embodying my invention. Fig. 2 is a vertical longitudinal section on line 2 2 of Fig. 1, and Fig. 3 is a bottom view of the ball-plate which is secured to the axle.

In said drawings, A represents the axle; B, the bolster; C, the socket-plate, and C' the socket therein for the ball. The socket-plate C is made in two parts, and is secured to the bolster by the clips $c$. These clips also of course serve in part to secure or bind the two parts of the socket-plate together. The socket-plate is provided with a lug, $c'$, to which a brace, $C^2$, leading to the box or body of the vehicle, is attached. This brace serves to prevent the bolster from rocking or turning on the box and to strengthen the ball-and-socket connection.

D is the ball-plate, which is secured to the axle by the clips $d$. The plate D is provided with inclined upper faces, $d'$ $d'$, which permit either end of the axle to incline to the bolster, but prevents the axle from rocking backward or forward, the front and rear points or stops, $d^2$, being high, and on a line with the under surface of the socket-plate, while the points or stops $d^3$ at either side are low, to allow the ball and socket to rock in this direction.

D' is the ball, which is preferably cast integral with the ball-plate D. The ball-plate D is provided with flanges $d^4$, to embrace the axle, and a right-angle strengthening-rib, $d^5$.

E E are jaws forming a socket for the tongue. These jaws are rigidly secured to the ball-plate, and preferably cast integral therewith.

F represents the tongue secured in this socket by the pivot or bolt $f$. The socket is made deeper than the thickness of the tongue, so that the tongue can play freely up and down on its pivot or draw-bolt. The front and rear stops, $d^2$, and side stops, $d^3$, which limit the extent and direction of the rocking motion of the axle and bolster, may of course consist of a separate ring or piece of metal from the ball-plate; but I deem it preferable to make these stops integral with the socket-plate.

In practicing the invention the ball-plate may be secured to the bolster instead of the axle; but in this case of course the high and low stops to limit the rocking motion would be secured to or cast integral with the socket-plate, so that these stops may be on or turn with the plate secured to the axle.

In order to compensate for the weight of the tongue, and the consequent tendency of the same to cause greater wear upon the rear part of the plates C and D, I place the ball-plate slightly back of the center line of the axle, so that the weight of the box and its load resting upon the ball will thus counterbalance the weight of the tongue. The extent to which the center of the ball-plate and the ball is located back of the middle line of the axle should be such as to slightly more than counterbalance the weight of the tongue when the wagon is loaded, and to slightly less than counterbalance it when the box is empty, and of course depends upon the weight of the tongue. Ordinarily, if the center of the ball is located from one-half inch to one inch back of the center or axial line of the axle, it will be sufficient to counterbalance the weight of the tongue.

I claim—

1. The combination, with the axle and bolster, of a ball and its plate and a socket and its plate, one secured to the axle and the other to the bolster, the plate secured to the axle having high stops in front and rear and low stops on each side, to limit the rocking of the axle and bolster, substantially as specified.

2. The combination of a socket and its plate with a ball and its plate, the one secured to the axle and the other to the bolster, the one secured to the axle having high stops in front and rear and low stops at each side, and provided with jaws to receive the tongue, substantially as specified.

3. The combination of the axle and bolster with a socket and its plate, a ball and its plate, the one secured to the bolster and the other to the axle, the plate secured to the bolster having a lug and brace leading to the wagon-body, and the plate secured to the axle having high stops in front and rear and low stops at each side, substantially as specified.

4. The combination of axle A with bolster B, socket C′, socket-plate C, provided with lug $c'$, brace $C^2$, ball D′, ball-plate D, provided with inclined faces $d$ in forming high stops $d^2$ in front and rear, and low stops $d^3$ at each side, and jaws E E to receive the tongue, substantially as specified.

5. The combination of the tongue with the bolster and axle and a ball-and-socket connection between the two, the bearing-point of said bolster on said axle or the center of said ball being located back of the axial or center line of the axle, so that the weight of the load will counterbalance the weight of the tongue, substantially as specified.

JAMES T. DOUGINE.

Witnesses:
H. M. MUNDAY,
TAYLOR E. BROWN.